Dec. 21, 1954
C. W. WOLF
2,697,577
SPOTLIGHT BRACKET
Filed Sept. 21, 1950
2 Sheets-Sheet 1
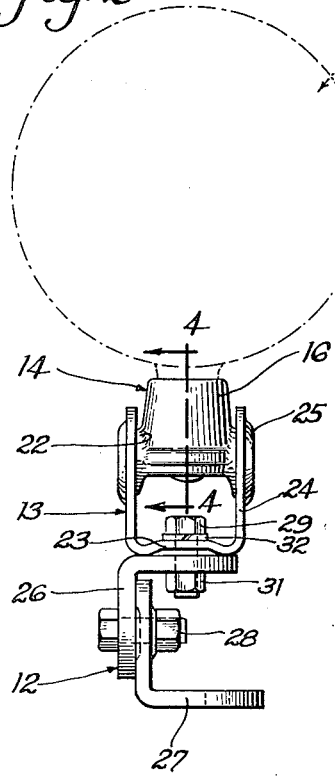
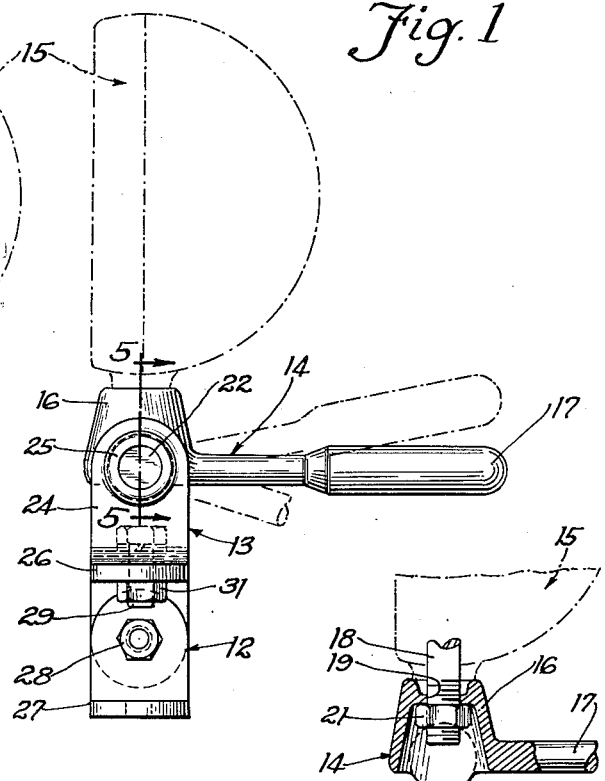
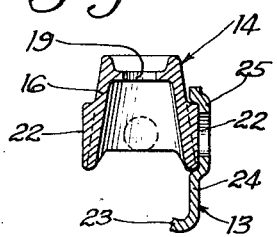
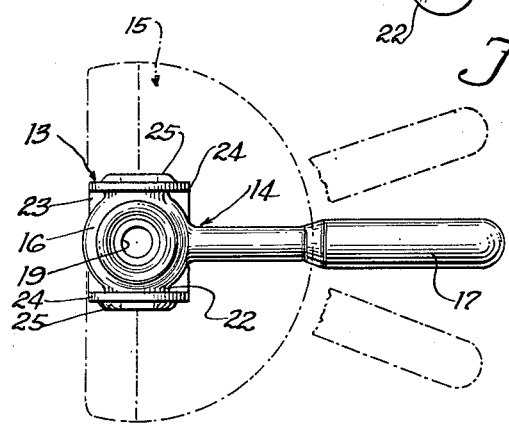
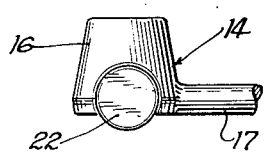
INVENTOR.
Charley W. Wolf
BY
Sheridan, Davis & Cargill
Att'ys

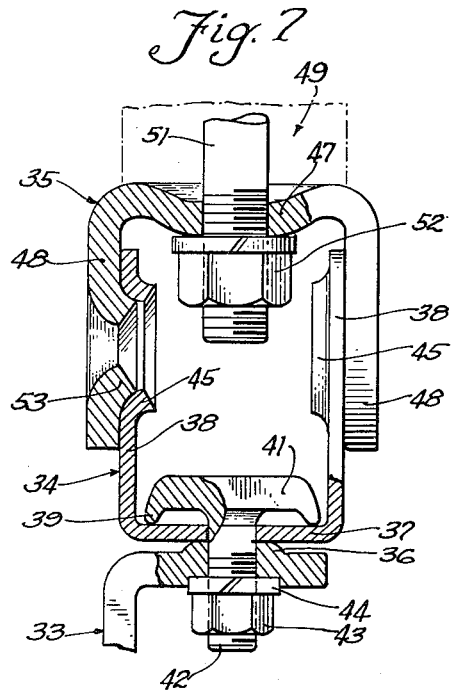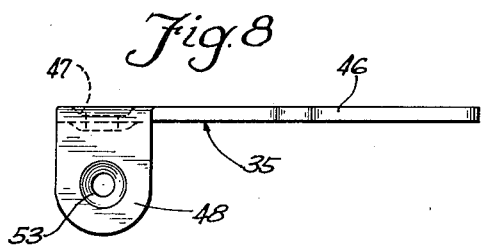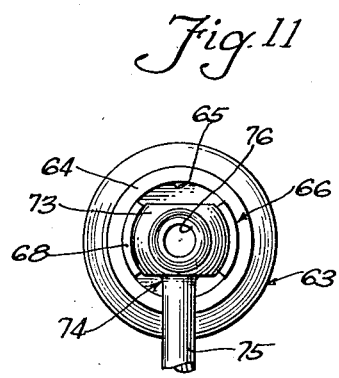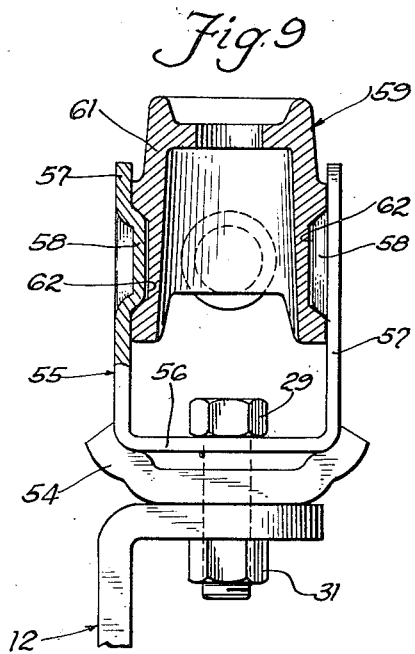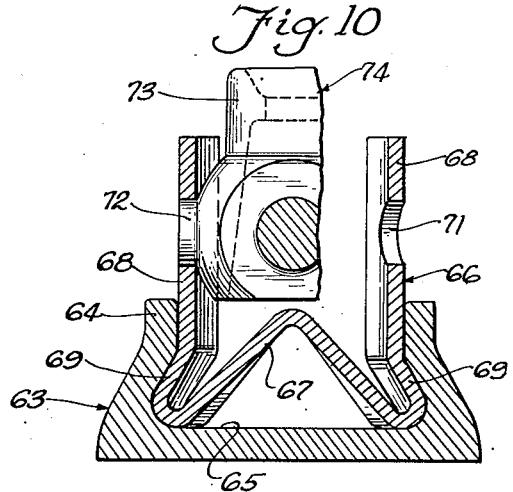
INVENTOR.
Charley W. Wolf
BY
Sheridan, Davis & Cargill
Att'ys United States Patent Office 2,697,577
Patented Dec. 21, 1954

2,697,577

SPOTLIGHT BRACKET

Charley W. Wolf, Cedar Rapids, Iowa, assignor to Midland Industries, Cedar Rapids, Iowa, a corporation of Iowa Application September 21, 1950, Serial No. 186,045

6 Claims. (Cl. 248—278)

This invention relates in general to mounting brackets, and more particularly to a bracket adapted to receive and support a light source, such as the headlight of a tractor, for selective universal movement as a spotlight.

Modern farm tractors presently are provided with headlights to facilitate night operations, but these are mounted in generally similar manner to those on passenger automobiles, so that their light is directed only forwardly of the vehicle. Thus, when it is necessary to execute a relatively sharp turn, for example, such as required at a turn-back point during corn cultivating, a dark spot is encountered by the operator at the most critical point, i. e., as he is attempting to swing the tractor around and direct it back accurately into alignment with the next adjacent rows of corn.

A principal object of this invention, therefore, is to provide an inexpensive bracket which may readily be mounted on a tractor, or the like, at any point convenient to the operator for receiving and supporting a suitable light source, such as one of the tractor headlights, which bracket includes a handle movable in any desirable direction to effect universal movement of the light source as a spotlight, whereby the tractor operator may have a readily adjustable spotlight at an extremely nominal cost.

Another object is the provision of such a spotlight bracket having a stationary portion, an intermediate portion pivotally mounted thereon for 360° movement in one plane, and a lamp supporting portion mounted on the intermediate portion for pivotal movement on an axis parallel to such plane, with novel means, comprising the intermediate portion and the pivotal mounting of the intermediate portion on the stationary portion, which frictionally resists relative movement between all three portions of the bracket.

A further object of the invention is the provision of such a bracket in which the movable lamp supporting portion is frictionally retained in any selectively adjusted position and in which adjustment of a single member effects desired changes in the frictional resistance to movement of the lamp supporting portion in all directions.

Another object is to facilitate variation of the adjustment maintaining forces in such a bracket so as to make it as simple as possible for anyone to adjust the same to obtain the exact and proper resistance necessary to counterbalance a headlight or other light source of any particular size and weight and maintain it in any desired adjusted position, while at the same time enabling selective movement of the light source to any other desired adjusted position with a minimum of effort.

More specifically, these objects are obtained by providing a spotlight bracket comprising an adjustably mountable stationary U-shaped bracket including a bight portion, an intermediate bracket pivotally mounted on the stationary bracket, and a lamp supporting bracket pivotally mounted on the intermediate bracket at right angles to the pivotal axis between the intermediate and stationary brackets, wherein the pivotal means for interconnecting the stationary and intermediate brackets not only maintains a desired frictional pressure between such brackets, but also maintains a desired frictional pressure between the intermediate bracket and the lamp supporting bracket.

The additional feature of the instant bracket of enabling adjustment of such frictional pressures by the simple expedient of adjusting only a single member is attained by forming the intermediate bracket with a base portion and a pair of arm portions upstanding therefrom for frictionally engaging trunnions on the lamp supporting bracket, and employing a pivot bolt for mounting the intermediate bracket on the stationary bracket in such manner that tightening of the bolt will increase the frictional pressure between the base portion of the intermediate bracket and the stationary bracket while at the same time increasing the frictional pressure between the upstanding arms of the intermediate bracket and the trunnion portions of the lamp supporting bracket.

Other objects of the invention relate to various features of construction which will be apparent from the consideration of the following specification and accompanying drawings, wherein:

Figure 1 is a side elevational view of a preferred form of the instant bracket showing a headlight in broken lines mounted on the lamp supporting portion thereof;

Fig. 2 is an end elevational view of the bracket of Fig. 1;

Fig. 3 is a top plan view of the bracket of Fig. 1;

Fig. 4 is a vertical sectional view, taken substantially on line 4—4 of Fig. 2, through the mounting end of the lamp supporting bracket;

Fig. 5 is a detail vertical section taken substantially on the line 5—5 of Fig. 1;

Fig. 6 is a side elevational view of the mounting end of the lamp supporting portion of the bracket of Fig. 1;

Fig. 7 is a vertical end elevation similar to Fig. 2, with parts shown in section similar to Fig. 5, of a modified form of bracket;

Fig. 8 is a side elevational view of the lamp supporting portion of the bracket of Fig. 7;

Fig. 9 is a view similar to Fig. 7 of a third modified form of bracket;

Fig. 10 is a vertical sectional view, similar to Fig. 5, of a fourth modified form of bracket, and Fig. 11 is a top plan view of the bracket of Fig. 10.

Referring more particularly to Figs. 1 through 6 of the drawings, the instant spotlight bracket therein illustrated comprises a stationary portion or bracket, indicated generally by reference numeral 12, an intermediate portion or bracket 13 pivotally mounted on the stationary portion 12, and a lamp supporting portion or bracket 14 pivotally mounted on the intermediate portion 13 and adapted to receive and support any suitable light source, such as the tractor headlight shown in broken lines and indicated by reference numeral 15. This lamp supporting portion or bracket 14 preferably is formed as an integral casting with a hollow head portion 16 and a handle 17 extending laterally from the lower end thereof. The upper end of this head portion 16 is shaped, as best shown in Fig. 4, to receive the lower mounting stud provided on any of the standard types of tractor headlights presently marketed, the headlight mounting bolt 18 passing through a suitable aperture 19 to receive a lock nut 21 for securing the headlight or light source 15 to the hollow head portion 16 in the manner shown in Fig. 4. The outer surface of the head portion 16 is provided with a pair of laterally extending and axially opposed trunnions 22 disposed at right angles to the axis of the handle 17 for engagement by the intermediate portion or bracket 13.

This intermediate bracket 13 is generally U-shaped in form and comprises a spring member having a base portion 23 terminating laterally in a pair of upstanding arms 24 formed integrally therewith and a connecting bight portion. Adjacent its upper end, each of these arms 24 is provided with a circular flange 25 extending outwardly therefrom to receive and frictionally engage one of the trunnions 22 of the lamp supporting bracket 14. It is preferred that the central portion of each of these circular flanges 25 be removed in order to limit the amount of surface engagement between the trunnions 22 and their pivotally supporting cradle comprising the upstanding arms 24 of the intermediate bracket 13. The intermediate bracket 13 thus comprises a substantially U-shaped spring member, the upstanding arms 24 of which may be sprung into pivotal conjunction with the trunnions 22 of the lamp supporting bracket 14.

The stationary portion or bracket 12 preferably comprises a pair of angle members 26 and 27, the vertical legs of which are rigidly, but adjustably, secured together by a bolt and nut retaining means 28, the bolt having a horizontally disposed axis and extending through suitable apertures provided in these vertical leg portions. The horizontal leg of the lower angle member 27 is provided with a similar aperture to accommodate suitable securing means for attaching the same to any selected supporting member, such as a frame part of a tractor convenient to the operator when he is driving the vehicle. The horizontal leg of the upper angle member 26 is provided with a similar aperture to receive a pivot bolt 29 which also extends downwardly through a similar aperture provided in the center of the base portion 23 of the intermediate bracket 13. The axis of this bolt 29 is vertical, or at right angles to that of the trunnions 22, and the bolt is provided with a suitable nut 31 and preferably with a lock washer 32 interposed between its head and the base 23. As best seen in Fig. 2, this base portion 23 of the intermediate bracket 13 has a raised central portion extending across it parallel with the upstanding arms 24 and extending upwardly a sufficient distance and spaced from the stationary bracket 12 to insure contact with the stationary bracket only along the lateral edge portions of the base 23.

It will thus be seen that the frictional pressure between substantially horizontal faces of the stationary bracket 12 and the intermediate bracket 13 resisting pivotal movement of the latter may be varied as desired by adjusting the pivot bolt 29 or its nut 31. At the same time, such adjustment will result in corresponding variation of the frictional pressure between substantially vertical faces of the arms 24 of the intermediate bracket 13 and the trunnions 22 of the lamp supporting bracket 14. In other words, tightening of the bolt 29 to increase the frictional pressure between the lateral edge portions of the base 23 and the horizontal leg of the upper angle member 26 also will apply downward forces against the raised or spaced central portion of the base 23 relative to the angle member 26 in the nature of restraining or bending forces which will be transmitted or translated by the base member 23 and the arms 24 into inwardly directed forces exerted by the arms 24 against their associated trunnions 22. The several parts are so dimensioned and designed, including the provision of the apertures in the circular flanges 25, that increasing or decreasing the frictional pressure between the intermediate bracket 13 and the stationary bracket 12 by tightening or loosening bolt 29 will result in increasing or decreasing the frictional pressure between the arms 24 and the trunnions 22 of the lamp supporting bracket 14 in corresponding amounts. Such adjustment is effected merely by tightening or loosening the bolt 29, and may be employed to compensate for different sizes and weights of different headlights or light sources 15, as well as to meet different operating conditions. Actually, once properly adjusted for a particular headlight, the bolt 29 normally will not require further adjustment. And, with the light source 15 mounted as indicated in the drawings, raising and lowering of its beam may be accomplished by lifting and depressing the handle 17, as indicated in broken lines in Fig. 1, and universal movement of the light source as a spotlight may be obtained by additionally swinging the handle 17 horizontally in either direction, as illustrated in broken lines in Fig. 3, the pivotal connection provided by bolt 29 permitting such horizontal rotation of the light source through 360°. A universal joint thus is provided for the light source 15, operable as desired by the handle 17, which comprises the pivotal connections established by the bolt 29, the trunnions 22, the arms 24 and their circular flanges 25, wherein the bolt 29 and its retaining nut 31 maintain the desired frictional pressure resisting movement of the universal joint in any direction. This arrangement further enables ready adjustment of such frictional pressure merely by tightening or loosening the bolt 29.

The modification of Figs. 7 and 8 accomplishes these same functions with a somewhat different construction of the several parts comprising such a universal joint. In this form of the invention, the stationary portion of the bracket is designated generally by reference numeral 33, the intermediate portion or bracket by reference numeral 34, and the lamp supporting portion or bracket by reference numeral 35. The upper horizontal leg of the stationary bracket 33 is provided with an apertured upset flange 36 defining an annular surface raised above the plane of the main top surface of this bracket. The intermediate portion or bracket 34, like the intermediate bracket 13 of the modification of Figs. 1 through 6, is a substantially U-shaped spring member and comprises a base portion 37 terminating laterally in a pair of upstanding arms 38 formed integrally therewith. As distinguished from the base portion 23 of the intermediate bracket 13, this base portion 37 of the intermediate bracket 34 is flat, and is adapted to be engaged on its upper surface outwardly from the flange 36 by the depending marginal flange 39 formed on the head 41 of a bolt 42 extending downwardly through the aperture in the flange 36 and a similar aperture provided in the base portion 37. A nut 43 and lock washer 44 are mounted on the lower end of this bolt 42. The upstanding arms 38 of this intermediate bracket 34 are upset inwardly to provide inwardly extending circular flanges 45 which are reversely disposed in comparison to the circular flanges 25 on the arms 24 and which preferably are apertured in similar manner and for the same reasons as these previously described flanges 25.

The lamp supporting portion or bracket 35 differs considerably in construction from the previously described lamp supporting bracket 14, and comprises a flat handle portion 46 terminating at one end in a vertically apertured depressed portion 47 (Fig. 7) formed integrally with a pair of depending arms or wings 48 disposed in parallel relationship to each other. Any desired light source, illustrated in Fig. 7 in broken lines at 49, may be mounted on this end of the lamp supporting bracket 35 with its mounting bolt 51 extending downwardly through the aperture therein and provided with a suitable lock nut 52. Each of the depending arms or wings 48 is provided with a trunnion in the form of a circular flange 53 apertured as illustrated in Fig. 7 and struck inwardly therefrom. These trunnions 53 are dimensioned to rotatively cooperate with the circular flanges 45, the intermediate bracket 34 comprising a U-shaped spring member, the upstanding arms 38 of which may be sprung into such conjunction with the cooperating trunnions 53.

As will be appreciated from the disclosure of this modified form of bracket shown in Fig. 7, tightening of the nut 43 will increase the frictional resistance between the lower surface of the base portion 37 of the intermediate bracket 34 and the upper surface of the raised flange 36 on the stationary bracket 33. Such tightening of nut 43 also will result in bending forces being applied by the annular flange 39 of bolt 42 to the intermediate bracket 34 tending to spread the upstanding arms 38 away from each other, which correspondingly will increase the frictional pressures between the coacting and substantially vertical surfaces of the circular flanges 45 and the trunnions 53 cradled therein.

The third modification of the invention illustrated in Fig. 9 is considerably closer in construction to that of Fig. 1 through 6 than is the modification of Figs. 7 and 8. In this modified form of Fig. 9, a concave or dished circular member 54 is interposed between the stationary portion or bracket 12 and the lower peripheral portion of an intermediate bracket 55. This intermediate bracket 55 comprises a flat base portion 56 formed integrally with a pair of upstanding arms 57. The peripheral portion of this intermediate bracket, comprising the junctions of these arms 57 with the base 56, is that part of the bracket which is rotatably seated within the upper marginal portion of the concave member 54. The pivot bolt 29 extends downwardly through suitable aligned apertures in the base portion 56, the concave member 54 and the upper horizontal leg of the stationary bracket 12, with the retaining nut 31 mounted on the bolt in contacting relationship with the stationary bracket. Tightening of the bolt 29 thus will result in increasing the frictional resistance to pivotal movement of the intermediate bracket 55 relative to the stationary bracket 12.

The upstanding arms 57 of this intermediate bracket 55 are each provided with an inwardly extending circular flange or trunnion 58 which are axially aligned with each other normal to the axis of the bolt 29. This modified bracket is completed by a lamp supporting portion or bracket 59 having a hollow head portion 61 constructed similarly to the hollow head portion 16 of the lamp supporting bracket 14, except that it is provided with diametrically opposed circular recesses 62, instead of trunnions 22, which pivotally cooperate with and cradle the trunnions 58. The intermediate bracket 55, like the intermediate brackets 13 and 34, comprises a substantially U-shaped spring member which may be sprung over the hollow head 61 of the lamp supporting bracket 59 to engage its trunnions 58 in the recesses 62 of bracket 59. As will be appreciated from the illustration in Fig. 9, not only will tightening of bolt 29 or nut 31 increase the frictional pressure resisting relative movement between the intermediate bracket 55 and the stationary bracket 12, but it also correspondingly will increase the frictional pressure resisting relative movement between the intermediate bracket and the lamp supporting bracket 59 by virtue of the central portion of the base 56 being spaced above the central portion of the concave member 54. It will be appreciated that the concave member 54 may move with the intermediate bracket 55 relative to the stationary bracket 12 or it may remain stationary with the latter, or it may be formed integrally with the stationary bracket 12, if desired.

The fourth modified form of bracket illustrated in Figs. 10 and 11 employs the same principles of operation hereinbefore described relative to the modifications of Figs. 1 through 6 and Fig. 9, but eliminates the pivotal retaining bolt 29 and its additional function of varying the frictional pressures resisting relative movement between the several parts of the universal joint provided by these brackets. In this modification of Figs. 10 and 11, a stationary portion or bracket 63 is provided which may be constructed similarly to the stationary bracket 12 except that it is formed at its upper end with an annular flange 64 defining a circular, outwardly undercut recess 65. An intermediate portion or bracket 66 generally W-shaped is formed as a spring member comprising an inverted V-shaped base 67 terminating at its outer ends in upstanding arms 68 bent outwardly at 69 at their lower ends adjacent their joinder with the base 67 to conform to the undercut shape of the recess 65 defined by the vertical flange 64. These upstanding arms 68 are provided with axially aligned apertures 71 for receiving and pivotally cooperating with circular flanges or trunnions 72 formed on the outer surface of a hollow head portion 73 of a lamp supporting portion or bracket, indicated generally by reference numeral 74. This lamp supporting bracket 74 is provided further with a handle portion 75 (Fig. 11) and an aperture 76 for receiving the retaining bolt of a headlight or other light source, similar to the handle 17 and aperture 19 of the lamp supporting bracket 14. The spring member or intermediate bracket 66 may be mounted as illustrated in Fig. 10 within the circular recess 65 of the stationary bracket 63 by first compressing the outwardly bent lower end portions 69 inwardly. Subsequent insertion of this intermediate bracket 66 into the circular recess 65 will result in the base portion 67 assuming its normal position of Fig. 10 to establish frictional pressure against the inner walls of the circular recess 65 to resist rotative movement of the intermediate bracket 66 relative to the stationary bracket 63. Thereafter, the lamp supporting bracket 74 may be assembled as illustrated in the drawings merely by springing the upper ends of the arms 68 apart or outwardly sufficiently to permit downward movement of the head portion 73 to bring the trunnions 72 into registration with the apertures 71. By virtue of such design of these several parts, the intermediate bracket 66 will not only maintain the desired frictional resistance against movement thereof relative to the stationary bracket 63, but also will maintain the desired frictional resistance against pivotal movement of the lamp supporting bracket 74 relative thereto.

It is thought that the invention and its attendant advantages will be understood from the foregoing description, and it will be apparent that various changes may be made in the form, construction and arrangement of the parts without departing from the spirit and scope of the invention or sacrificing all of its material advantages, the forms hereinbefore described and illustrated in the drawings being merely preferred embodiments thereof.

I claim:

1. A mounting device for a spotlight or the like comprising a lamp supporting bracket, an intermediate bracket including legs pivotally mounting said lamp supporting bracket by frictional surface contact for movement in a given plane and frictionally bearing against the sides of said lamp supporting bracket, an integral bight portion connecting said legs, said intermediate bracket being of flexible resilient material, a stationary bracket including at least one extending plate parallel to said bight portion, said bight portion being spaced from said last mentioned plate throughout at least a portion of its length, a pivot connecting said bight portion and said plate for rotative movement in a plane transverse to said first mentioned plane, clamping elements on opposite sides of said pivot, said elements serving to clamp said bight portion and said plate together to frictionally resist rotation of said intermediate bracket in said transverse plane, and one of said clamping elements engaging said bight, and the other of said clamping elements engaging said plate, one element engaging one of the spaced apart portions thereof for bowing said bight toward said plate of said stationary bracket to move said legs of said intermediate bracket and clampingly hold said lamp supporting bracket against pivotal movement in said given plane.

2. A mounting device for a spotlight or the like comprising a lamp supporting bracket, an intermediate bracket including legs pivotally mounting said lamp supporting bracket by frictional surface contact for movement in a given plane and frictionally bearing against the sides of said lamp supporting bracket, an integral bight portion connecting said legs, said intermediate bracket being of flexible resilient material, a stationary bracket including at least one extending plate parallel to said bight portion, said bight portion being spaced from said last mentioned plate throughout at least a portion of its length, a pivot connecting said bight portion and said plate for rotative movement in a plane transverse to said first mentioned plane, clamping elements on opposite sides of said pivot, said elements serving to clamp said bight portion and said plate together to frictionally resist rotation of said intermediate bracket in said transverse plane, and one of said clamping elements engaging said bight, and the other of said clamping elements engaging said plate, one element engaging one of the spaced apart portions thereof for bowing said bight toward said plate of said stationary bracket to move said legs of said intermediate bracket and clampingly hold said lamp supporting bracket against pivotal movement in said given plane, said legs of said intermediate bracket engaging the exterior of said lamp supporting bracket and clampingly engaging the latter therebetween.

3. A mounting device for a spotlight or the like comprising a lamp supporting bracket, an intermediate bracket including legs pivotally mounting said lamp supporting bracket by frictional surface contact for movement in a given plane and frictionally bearing against the sides of said lamp supporting bracket, an integral bight portion connecting said legs, said intermediate bracket being of flexible resilient material, a stationary bracket including at least one extending plate parallel to said bight portion, said bight portion being spaced from said last mentioned plate throughout at least a portion of its length, a pivot connecting said bight portion and said plate for rotative movement in a plane transverse to said first mentioned plane, clamping elements on opposite sides of said pivot, said elements serving to clamp said bight portion and said plate together to frictionally resist rotation of said intermediate bracket in said transverse plane, and one of said clamping elements engaging said bight, and the other of said clamping elements engaging said plate, one element engaging one of the spaced apart portions thereof for bowing said bight toward said plate of said stationary bracket to move said legs of said intermediate bracket and clampingly hold said lamp supporting bracket against pivotal movement in said given plane, said legs of said intermediate bracket engaging the interior sides of said lamp supporting bracket and biasing the same outwardly to secure said bracket against pivotal movement in said given plane.

4. A mounting device for a spotlight or the like comprising a lamp supporting bracket, an intermediate bracket including legs pivotally mounting said lamp supporting bracket by frictional surface contact for movement in a given plane and frictionally bearing against the sides of said lamp supporting bracket, an integral bight portion connecting said legs, said intermediate bracket being of flexible resilient material, a stationary bracket including at least one extending plate parallel to said bight portion, said bight portion being spaced from said last mentioned plate throughout at least a portion of its length, a pivot connecting said bight portion and said plate for rotative movement in a plane transverse to said first mentioned plane, clamping elements on opposite sides of said pivot, said elements serving to clamp said bight portion and said plate together to frictionally resist rotation of said intermediate bracket in said transverse plane, and one of said clamping elements engaging said bight, and the other of said clamping elements engaging said plate, one element engaging one of the spaced apart portions thereof for bowing said bight toward said plate of said stationary bracket to move said legs of said intermediate bracket and clampingly hold said lamp supporting bracket against pivotal movement in said given plane, said bight portion being centrally bowed upwardly to provide the spacing thereof from said leg.

5. A mounting device for a spot light or the like comprising a lamp supporting bracket, an intermediate bracket including legs pivotally mounting said lamp supporting bracket by frictional surface contact for movement in a given plane and frictionally bearing against the sides of said lamp supporting bracket, an integral bight portion connecting said legs, said intermediate bracket being of flexible resilient material, a stationary bracket including at least one extending plate parallel to said bight portion, said bight portion being spaced from said last mentioned plate throughout at least a portion of its length, a pivot connecting said bight portion and said plate for rotative movement in a plane transverse to said first mentioned plane, clamping elements on opposite sides of said pivot, said elements serving to clamp said bight portion and said plate together to frictionally resist rotation of said intermediate bracket in said transverse plane, and one of said clamping elements engaging said bight, and the other of said clamping elements engaging said plate, one element engaging one of the spaced apart portions thereof for bowing said bight toward said plate of said stationary bracket to move said legs of said intermediate bracket and clampingly hold said lamp supporting bracket against pivotal movement in said given plane, said plate having a centrally recessed portion providing the spacing of said bight from said plate.

6. A mounting device for a spotlight or the like comprising a lamp supporting bracket, an intermediate bracket including legs pivotally mounting said lamp supporting bracket by frictional surface contact for movement in a given plane and frictionally bearing against the sides of said lamp supporting bracket, an integral bight portion connecting said legs, said intermediate bracket being of flexible resilient material, a stationary bracket including at least one extending plate parallel to said bight portion, said bight portion being spaced from said last mentioned plate throughout at least a portion of its length, a pivot connecting said bight portion and said plate for rotative movement in a plane transverse to said first mentioned plane, clamping elements on opposite sides of said pivot, said elements serving to clamp said bight portion and said plate together to frictionally resist rotation of said intermediate bracket in said transverse plane, and one of said clamping elements engaging said bight, and the other of said clamping elements engaging said plate, one element engaging one of the spaced apart portions thereof for bowing said bight toward said plate of said stationary bracket to move said legs of said intermediate bracket and clampingly hold said lamp supporting bracket against pivotal movement in said given plane, said plate having cut away portions therein at each end, and said one of said clamping elements having a depending flange engaging said bight portion adjacent said cut away portions to bow the same downwardly into said cut away portions.

References Cited in the file of this patent

UNITED STATES PATENTS

| Number | Name | Date |
|---|---|---|
| 759,926 | Smith | May 17, 1904 |
| 943,573 | Simon | Dec. 14, 1909 |
| 1,246,119 | Larson | Nov. 13, 1917 |
| 1,321,257 | Stearns | Nov. 11, 1919 |
| 1,735,149 | Werner | Nov. 12, 1929 |
| 2,175,918 | Sauer | Oct. 10, 1939 |
| 2,526,070 | Early | Oct. 17, 1950 |
| 2,596,009 | Connor et al. | May 6, 1952 |

FOREIGN PATENTS

| Number | Country | Date |
|---|---|---|
| 15,019 | Great Britain | June 23, 1897 |
| 465,699 | Great Britain | of 1937 |
| 511,618 | Germany | of 1930 |